Oct. 1, 1963         H. L. HOCKEL ETAL         3,105,470
COMPRESSION IGNITION ENGINES
Filed Sept. 28, 1960                           2 Sheets-Sheet 2

3,105,470
COMPRESSION IGNITION ENGINES
Hans Ludwig Hockel, Mannheim-Feudenheim, and Erich Strickle, Mannheim, Germany, assignors to Motoren-Werke Mannheim A.G. vorm. Benz Abt. stat. Motorenbau, Mannheim, Germany, a German company
Filed Sept. 28, 1960, Ser. No. 58,964
Claims priority, application Germany Dec. 5, 1959
3 Claims. (Cl. 123—32)

The invention relates to compression ignition engines in which toward the end of the compression stroke liquid fuel is arranged to be injected in a thin core into a pre-chamber symmetrically to the axis of the latter, the pre-chamber and cylinder space being connected together by a throttling orifice, arranged symmetrically to the pre-chamber, the narrowest part of which orifice is adjacent the cylinder space.

It is an object of the invention to enable the torque output curve of such an engine to be adapted extensively to the conditions in which the engine is to operate. In this connection, it is desirable for the maximum torque or maximum mean effective pressure to occur at medium or low speeds of rotation.

Figure 1:
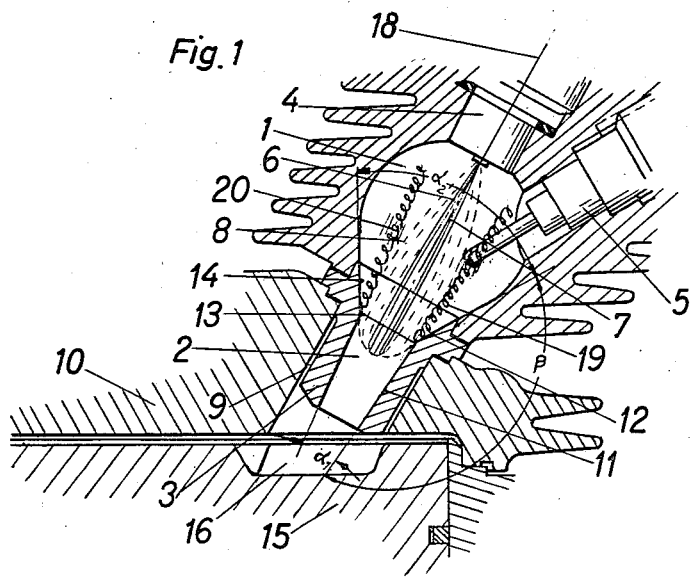
Figure 2:
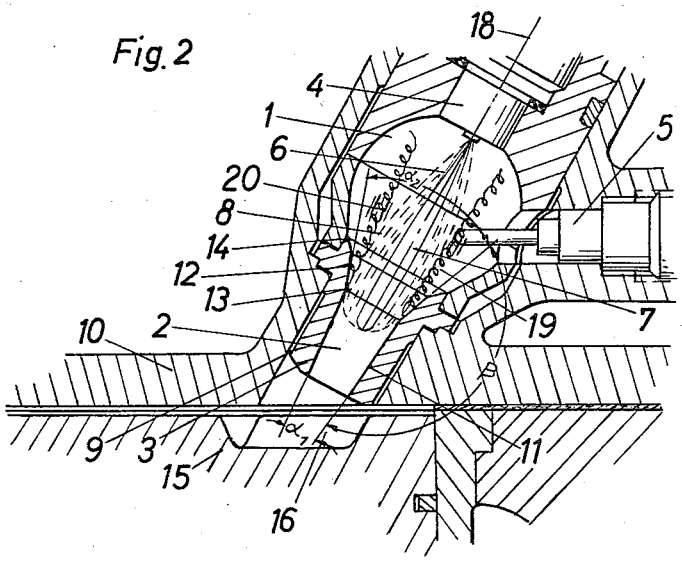
Figure 3:
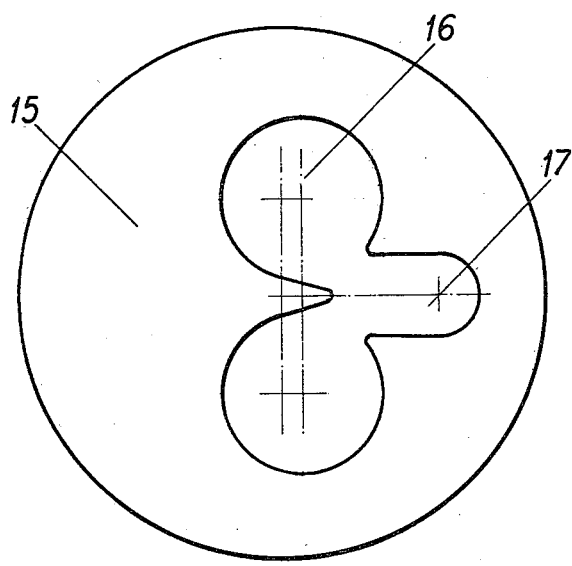
Figure 4:
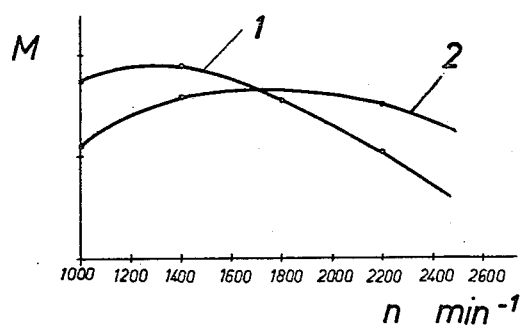

For a better understanding of the invention and to show how the same may be carried into effect, reference will now be made to the accompanying drawings, in which:

FIGURE 1 is a cross-sectional view of part of the cylinder head of a compression ignition engine in which the maximum torque lies at about half engine speed, FIGURE 2 is a similar view of another construction in which the maximum torque lies at about 70% of maximum engine speed, FIGURE 3 is a plan view of a piston, and FIGURE 4 is a diagram showing the relation between torque M and speed $n$ for the constructions according to FIGURES 1 and 2.

In each of FIGURES 1 and 2, a pre-chamber is denoted by 1, and an insert forming a communication orifice 2 by 3. An injection nozzle 4 and a glow plug 5 project into the pre-chamber 1. The injection nozzle 4 is preferably formed as a pintle type nozzle with a theoretical spray angle of 0°. The fuel jet 6 consists of a slender core jet 7 and a droplet mist 8. In water-cooled engines, the pre-chamber 1 is preferably thermally insulated from the cylinder head by an air gap. In air-cooled engines, arrangement of the pre-chamber in the cooling air stream provides a serviceable heat condition of the pre-chamber during operation. In both cases, the insert 3 may be insulated from the cylinder head base 10 by an air gap 9. The insert 3 as previously indicated forms the communication orifice 2. This includes a narrowest part 11, the angle of aperture $\alpha_1$ of which is 10° in the case of the constructions according to FIGURES 1 and 2. Part 11 can also be cylindrical. Adjoining the part 11 is a conical enlargement 12, the angle of aperture $\alpha_2$ of which lies between 30 and 60°. The walls of the enlargement 12 and of the part 11 at the transition 13 form the sides of a transistion angle $\beta$, which lies between 150 and 170°. The enlargement 12 may as in FIGURE 2 be followed by a further cone 14, which in the present case has an angle of aperture of 90°. In the top dead center position of the piston 15, the cylinder space is formed mainly by swirl pockets 16 which communicate with the orifice 2. The remainder of the piston end is flat, and at top dead center is spaced from the cylinder head base 10 by the usual safety spacing. The piston depression has the same depth at all points. At top dead center, the pre-chamber 1 and the communication orifice 2 contain preferably about 50% of the combustion air. This amount may vary considerably upwardly and downwardly. The distance from the transition 13 to the end face of the injection nozzle 4 is approximately 1 to 1.3 of the maximum pre-chamber diameter. The axis 18 of the pear-shaped or spherical pre-chamber 1 lies inclined and off-center in the cylinder head. The axis 18 is at the same time also the axis of the communication orifice 2. The position of the pre-chamber shown is intended for two-valve engines. The position of the valves is indicated in FIGURE 3. The narrowest cross-section of the part 11 of the communication orifice 2 is about $\frac{1}{100}$ to $\frac{1}{200}$ of the piston face area. This value relates to engines having a mean piston speed of about 10 metres per second. The smaller communication orifice 2 pertains to speeds of rotation in the vicinity of 3000 rev./min., the larger one to speeds in the vicinity of 2000 rev./min. For a better understanding, the form of the air swirl or eddy and the intended position of the first ignition are indicated. The air swirl is indicated by 19 and the place of the first ignition by 20.

The operation of the engines of FIGURES 1 and 2 may be explained as follows. Torque and mean effective pressure vary proportionally, with speed of rotation. The value of the mean effective pressure depends substantially on the air utilization, and mainly on the utilization of the proportion of air in the cylinder space. In this connection it is important that the proportion of injected fuel, for the combustion of which the air in the pre-chamber is inadequate, shall be ejected as rapidly and as powerfully as possible into the cylinder space by the pre-combustion occurring in the pre-chamber. According to experience this is only possible when, at the moment of ignition, the portion of fuel intended for combustion in the cylinder space has already advanced beyond the place of the first ignition in the direction of the cylinder space. The detailed course of injection and combustion is as follows: Injection generally begins about 1 to 2 milliseconds before top dead center, which in engines of varying speed corresponds to a varying value of crank degrees. The fuel jet passes through the pre-chamber with an initial velocity of about 100 metres per second falling rapidly to about 10 to 20 metres per second with the usual injection pressures, so that after the lapse of the 1 to 2 milliseconds ignition delay, its tip is in the vicinity of the opening of the communication orifice into the cylinder space. During this period, hot air flows through the communication orifice into the pre-chamber at a velocity which diminishes from a value of 200 to 400 metres per second at the commencement of injection to 0 at top dead center without particularly impeding the advance of the fuel jet. At the transition 13, the air flow separates turbulently, and encounters the outer droplet mist of the fuel jet, these fine droplets mixing with the air, while the core jet still remains substantially solid. The point in which the ignition occurs appears to depend upon the degree of turbulence and the inflow velocity. The best effect occurs when the point of ignition lies in the middle part of the pre-chamber. The flame is propagated from that point almost instantaneously in both directions along the fuel jet, and the increase in pressure occurring in the middle part of the pre-chamber drives into the cylinder space the fuel which has advanced beyond the point of ignition in the direction of the cylinder space. If with a small transition angle, there occurs simultaneously a powerful turbulence and at maximum speed a high inflow velocity, the point of ignition appears to be so close to the injection nozzle that the fuel which actually ought to be burnt in the pre-chamber, is discharged into the cylinder space, where at first it does not find sufficient air. If, on the other hand, the inflow velocity at low speed is low, while simultaneously turbulence with a large transition angle or radius is small, the place of ignition appears to be too close to the communication orifice, so that the rise in pressure at this place holds back too much fuel in the pre-chamber, in which there is insufficient air for combustion. Accordingly, it appears that an equally good result can be obtained with powerful turbulence corresponding to a small transition angle and low inflow velocity, and with weak turbulence, corresponding to a large transition angle and high inflow velocity. It is therefore possible for the maximum torque to be placed in the desired speed range by choice of the transition angle $\beta$.

The mathematical magnitude $V_E$ of the inflow velocity is determined, for the sake of simplicity, from the formula $$V_E = \frac{F_K \cdot V_K}{F_E} \text{ (metres per second)}$$

where $V_K$ is the instantaneous piston velocity at the commencement of injection, $F_K$ the piston area and $F_E$ the least cross-section of the inflow orifice.

Maximum torque occurs substantially between 50 and 70% of the maximum speed of rotation if the angle formed at the transition between the walls of the narrowest part and the enlargement is between 150 and 170°, the velocity of the air entering the pre-chamber at the commencement of the injection being in the first case about 200 metres per second and in the second case about 350 metres per second.

We claim:
1. A compression ignition engine comprising a cylinder, a piston slidable in said cylinder and having a crown with a depression therein, a cylinder head defining together with said piston and said cylinder a main combustion space, an auxiliary chamber fastened to said cylinder head, said chamber communicating via a duct with said main combustion space, said auxiliary chamber having an axis, said duct facing said depression and being coaxial with said axis, said duct consisting of a first narrow portion adjacent said depression and widening towards said chamber, a conical portion widening towards said chamber, said first and conical portions defining an obtuse angled first transition edge, a second conical portion widening towards said chamber and facing said chamber, said conical portions defining an obtuse angled second transition edge, a fuel injection nozzle adjacent said chamber and disposed symmetrically in relation to said axis to inject a fuel jet into said chamber towards the end of the compression stroke of said piston, the jet being directed towards said duct, said jet having a core of substantially coherent liquid particles surrounded by a zone of fine mist, said core having a spray angle of almost 0 degrees, said first transition edge having a transition angle between 150° and 170°, the smallest cross-section of said first portion having a value between $\frac{1}{100}$ and $\frac{1}{200}$ of the area of said piston, and the distance between said injection nozzle and said first transition edge being between 1 and 1.3 times the maximum width of said chamber measured perpendicularly of said axis, said portions and transition edges being so constructed and arranged to influence the amount of said jet passing the point of ignition in the auxiliary chamber prior to combustion such that the maximum torque of said engine will occur at a predetermined speed of said engine.

2. A compression ignition engine as claimed in claim 1, with the modification that said first portion is cylindrical, the cross-section of said cylindrical portion being between $\frac{1}{100}$ and $\frac{1}{200}$ of the area of said piston.

3. A compression ignition engine as claimed in claim 1, said chamber being defined by a spherical wall.

References Cited in the file of this patent

UNITED STATES PATENTS

| | | |
|---|---|---|
| 2,506,768 | Bentz et al. | May 9, 1950 |
| 2,674,983 | Kraus | Apr. 13, 1954 |
| 2,719,514 | Schilling | Oct. 4, 1955 |
| 2,734,491 | Hoffmann | Feb. 14, 1956 |
| 2,972,987 | Steidler | Feb. 28, 1961 |

FOREIGN PATENTS

| | | |
|---|---|---|
| 1,140,813 | France | Mar. 4, 1957 |
| 1,006,667 | Germany | Apr. 18, 1957 |